United States Patent [19]

Moroto et al.

[11] Patent Number: 5,191,532
[45] Date of Patent: Mar. 2, 1993

[54] NAVIGATION APPARATUS

[75] Inventors: Shuzo Moroto; Takashi Yamada, both of Anjo, Japan

[73] Assignees: Aisin AW Co., Ltd.; Kabushiki Kaisha Shinsangyokaihatsu, both of Japan

[21] Appl. No.: 772,121

[22] Filed: Oct. 9, 1991

Related U.S. Application Data

[63] Continuation of Ser. No. 630,785, Dec. 21, 1990, abandoned, which is a continuation of Ser. No. 392,930, Aug. 1, 1989, abandoned.

[30] Foreign Application Priority Data

Dec. 5, 1987 [JP] Japan .................................. 2-307805

[51] Int. Cl.$^5$ ............................................. G06F 15/50
[52] U.S. Cl. .................................... 364/449; 364/444; 340/990; 340/995
[58] Field of Search ..................... 364/443, 444, 449; 73/178 R; 340/988, 990, 995

[56] References Cited

U.S. PATENT DOCUMENTS

| | | | |
|---|---|---|---|
| 4,646,089 | 2/1987 | Takanabe et al. | 340/988 |
| 4,737,927 | 4/1988 | Hanabusa et al. | 364/449 |
| 4,780,717 | 10/1988 | Takanabe et al. | 340/990 |
| 4,796,189 | 1/1989 | Nakayama et al. | 364/449 |
| 4,827,420 | 5/1989 | Musa | 340/988 |
| 4,890,104 | 12/1989 | Takanabe et al. | 340/990 |
| 4,943,925 | 7/1990 | Moroto et al. | 364/444 |
| 4,992,947 | 2/1991 | Nimura et al. | 364/449 |
| 5,059,965 | 10/1991 | Geiser | 364/449 |
| 5,067,082 | 11/1991 | Nimura et al. | 364/444 |
| 5,072,395 | 12/1991 | Bliss et al. | 364/444 |

*Primary Examiner*—Gary Chin
*Attorney, Agent, or Firm*—Lorusso & Loud

[57] ABSTRACT

A navigation apparatus, in which guidance information for travel to a desired destination is outputted upon inputting the desired destination, has an input unit for inputting a desired destination, a memory unit for storing guidance information and destination information, and a display unit for outputting the guidance information and input information from the input unit, characterized in that the destination information has region name data and information data related to regions, and information data relating to a region is obtained by inputting the region name from the input unit. When input of the name of a prefecture, city or town for which a destination has not been specified is selected, a course search routine is executed in which a prefecture name list, city name list and town name list are retreived in order by the entry of prefecture name, city name and town name, the storage addresses of an intersection list and landmark list are obtained and an intersection at the destination is set. Accordingly, even in case of ambiguity where a destination cannot be specified, a concrete destination, such as a representative intersection or a representative landmark, is called from the ambiguous destination so that navigation to this destination can be performed.

6 Claims, 17 Drawing Sheets

FIG. 5 (a)

PREFECTURE NAME LIST

PREFECTURE NO. 01:

| Value | Description |
|---|---|
| AITI PREFECTURE | ← PREFECTURE NAME (KANJI) |
| AITI PREFECTURE | ← PREFECTURE NAME (HIRAGANA) |
| AITIKEN | ← PREFECTURE NAME (ROMAN CHARACTERS) |
| 01 | ← PREFECTURE NO. |
| 00F34 | ← CITY NAME LIST STORAGE ADDRESS |
| 53 | ← NUMBER OF CITY NAME LIST DATA ITEMS |
| 1139 | ← REPRESENTATIVE INTERSECTION LANDMARK NO. |

FIG. 5 (b)

CITY NAME LIST

| Value | Description |
|---|---|
| ANJYO CITY | ← CITY NAME (KANJI) |
| ANJYO CITY | ← CITY NAME (HIRAGANA) |
| ANJYOSI | ← CITY NAME (ROMAN CHARACTERS) |
| 01 | ← CITY NO. |
| 00F33 | ← TOWN NAME LIST STORAGE ADDRESS |
| 20 | ← NUMBER OF TOWN NAME LIST DATA ITEMS |
| 1023 | ← REPRESENTATIVE INTERSECTION LANDMARK NO. |

FIG. 5 (c)

TOWN NAME LIST

| Value | Description |
|---|---|
| FUJI TOWN | ← TOWN NAME (KANJI) |
| FUJI TOWN | ← TOWN NAME (HIRAGANA) |
| FUJITYO | ← TOWN NAME (ROMAN CHARACTERS) |
| 01 | ← TOWN NO. |
| 0FF5314 | ← INTERSECTION LIST STORAGE ADDRESS |
| 423 | ← NUMBER OF INTERSECTION LIST DATA ITEMS |
| 0FF5993 | ← LANDMARK LIST STORAGE ADDRESS |
| 145 | ← NUMBER OF LANDMARK LIST DATA ITEMS |
| 193 | ← REPRESENTATIVE INTERSECTION LANDMARK NO. |

FIG. 6(a)

INTERSECTION LIST

| INTERSECTION NO. |
|---|
| 1 |
| 2 |
| 3 |
| 27 |
| 36 |
| 56 |
| ⋮ |

FIG. 6(b)

LANDMARK LIST

| LANDMARK NO. |
|---|
| 1010 |
| 1011 |
| 1012 |
| 1536 |
| 1600 |
| 1609 |
| ⋮ |

FIG. 6(c)

ROMAN CHARACTER SORT FILE

| PREFECTURE NAME (ROMAN CHARACTERS) | DATA STORAGE ADDRESS |
|---|---|
| AITIKEN | ØF84Ø |
| ⋮ | ⋮ |

FIG. (d)

HIRAGANA SORT FILE

| PREFECTURE NAME (HIRAGANA) | DATA STORAGE ADDRESS |
|---|---|
| AITI PREFECTURE | ØF84Ø |
| ⋮ | ⋮ |

FIG. 7(a)

INTERSECTION DATA

| INTERSECTION NO. | INTERSECTION NAME | NORTH LATITUDE | EAST LONGITUDE | ROAD WITH SMALLEST ROAD NO. AMONG THOSE HAVING THIS INTERSECTION AS STARTING POINT | ROAD WITH SMALLEST ROAD NO. AMONG THOSE HAVING THIS INTERSECTION AS END POINT | SIGNAL PRESENT? |
|---|---|---|---|---|---|---|
| 1 | ○○○○ | 35.00 | 135.7 | 1 | 2 | YES |
| 2 | ○○○○ | 35.01 | 135.8 | 2 | 1 | YES |
| ----- | ----- | | | ----- | ----- | |
| 1000 | ○○○○ | 35.1 | 135.0 | 6 | 5 | NO |

FIG. 7(b)

LANDMARK DATA

| LANDMARK NO. | LANDMARK NAME | NORTH LATITUDE | EAST LONGITUDE | CONNECTING INTERSECTION NO. | CONNECTING INTERSECTION NO. |
|---|---|---|---|---|---|
| 1001 | ○○○ | 35.3 | 135.0 | 10 | 11 |
| 1002 | ○○○ | 35.4 | 135.1 | 13 | 56 |
| ----- | ----- | | | ----- | ----- |
| 2000 | ○○○ | 35.3 | 135.9 | 103 | 104 |

ROAD DATA

| ROAD NO. | STARTING POINT | END POINT | NO. OF NEXT ROAD HAVING SAME STARTING POINT | NO. OF NEXT ROAD HAVING SAME END POINT | ROAD WIDTH | PROHI-BITION | PROHI-BITION | GUID-ANCE UNNEC-ESSARY | PHOTO-GRAPH NO. |
|---|---|---|---|---|---|---|---|---|---|
| 1 | 1 | 2 | 7 | 4 | 1 | 1 | 2 | 3 | 1 |
| 2 | 2 | 1 | 3 | 8 | 1 | — | — | 7 | 2 |
| 3 | 2 | 3 | 2 | 3 | 2 | — | — | 5 | 3 |
| 4 | 3 | 2 | 5 | 6 | 2 | — | — | 2 | 4 |
| 5 | 3 | 4 | 4 | 7 | 2 | 6 | 2 | 8 | 5 |
| 6 | 4 | 2 | 8 | 1 | 1 | 3 | — | — | 6 |
| 7 | 1 | 4 | 1 | 5 | 0 | — | — | — | 7 |
| 8 | 4 | 1 | 6 | 2 | 0 | — | — | 1 | 8 |

NAVIGATION APPARATUS

This application is a continuation of application number 07/630,785, filed Dec. 21, 1990, now abandoned, which is a continuation of application Ser. No. 07/392,930, filed Aug. 1, 1989, now abandoned.

DESCRIPTION

1. Technical Field

This invention relates to a navigation apparatus which, upon being provided with an input of a desired destination, outputs guidance information for travel to the destination.

2. Background Art

A navigation apparatus provides course guidance for travel to a destination to a driver who is unfamiliar with the local geography. Recent years have seen extensive development of such navigation apparatus.

Conventionally, a vehicular navigation apparatus is adapted to set a course from a starting point to a desired destination before the vehicle begins travelling, with course guidance being provided to the driver in accordance with the course set. In some of these apparatus, a map is displayed on the screen of a CRT and the course is superimposed on the map when the driver designates a specific course. In a case where an intersection at which a turn is to be made next is designated in accordance with the preset course, the distance to this intersection is displayed numerically or in the form of a graph. When a turn is to be made at an intersection using such a navigation apparatus, the driver observes the course displayed on the map to decide the next intersection at which the turn is to be made, or the driver looks at the numeric or graphical display to ascertain the distance to the intersection where the turn is to be made, thereby determining the proper intersection.

When entering the abovementioned destination, the driver enters a code taken from a table of codes and corresponding names set for each and every destination. Further, as proposed in Japanese Patent Application Laid-Open No. 62-51000, the driver designates and enters the name of a specific destination and adopts, as the destination, an intersection nearest the point of departure and located within a circle whose center is represented by the designated coordinates (north latitute and east longitude).

However, the conventional navigation apparatus is troublesome to use since the code input must be made by observing the code number-name table when entering the destination. In addition, there are cases where the driver has only a vague notion of the destination. For example, if the driver wishes to travel to Anjyo City in Aiti Prefecture, the destination cannot be entered and, hence, navigation is impossible. Further, in an input system proposed in the foregoing Japanese Patent Application Laid-Open No. 62-51000, difficulties are experienced in making an input when the driver does not know the place name (city name, town name, etc.) of the destination. Moreover, since the destination is decided within a circle, there is the danger that the destination may not coincide with the actual destination.

The above-described conventional navigation apparatus is such that a course is set from a starting point to a desired destination before the vehicle begins travelling and course guidance is provided to the driver in accordance with the course set. Consequently, it is difficult to alter a destination. In addition, a drawback is that if the driver should happen to mistake, say, an intersection and stray from the set course, travel in accordance with the guidance provided by the navigation apparatus will not be able to continue unless the vehicle is returned to the set course. Furthermore, a decision as to whether or not a predetermined intersection has been passed as specified by the course guidance is premised upon detection of travelled distance or a left or right turn as detected by a distance sensor or steering angle sensor, respectively. In actuality, however, detection of travelled distance and steering angle is susceptible to considerable error, which can cause errors in judgment.

In order to eliminate these drawbacks, the applicant has previously proposed (Japanese Patent Application No. 62-275059) a navigation apparatus in which coordinates of a plurality of geographical points are set and guidance information for travel to a desired destination is outputted at each of the geographical points when the desired destination is inputted. In this system, it is possible to change the destination and to search a course from any geographical point to the destination. How to obtain an output of the destination information and search for a course to the destination in a simple manner are important problems.

The present invention seeks to solve the aforementioned problems and its object is to provide a navigation apparatus in which, even if a destination is vague and defined as a specific location, useful related information leading to the destination can be called and the destination can be entered in a simple manner.

Another object of the present invention is to provide a navigation apparatus particularly effective in a navigation system of the type in which guidance information to a destination is outputted at each of a plurality of geographical points, whose coordinates have been set, when the destination is entered.

SUMMARY OF THE INVENTION

In order to attain the foregoing objects, the present invention provides a navigation apparatus in which guidance information for travel to a desired destination is outputted upon inputting the desired destination, the apparatus having an input unit for inputting a desired destination, a memory unit for storing guidance information and destination information, and a display unit for outputting the guidance information and input information from the input unit, characterized in that the destination information has region name data and information data related to regions, and information data relating to a region is obtained by inputting the region name from the input unit. Further, there is provided a navigation apparatus in which coordinates of a plurality of geographical points are set and guidance information for travel to a desired destination is outputted at each of the geographical points when the desired destination is inputted, the apparatus having an input unit for inputting a desired destination, a memory unit for storing guidance information and destination information, and a display unit for outputting the guidance information and input information from the input unit, characterized in that the destination information has region name data and information data relating to regions, and information data relating to a region is obtained by inputting the region name from the input unit.

Thus, in the present invention, as shown in FIG. 10, when input of the name of a prefecture, city or town for which a destination has not been specified is selected, a course search routine is executed in which a prefecture name list, city name list and town name list are retreived in order by the entry of prefecture name, city name and town name, the storage addresses of an intersection list and landmark list are obtained and an intersection at the destination is set.

Accordingly, with the navigation apparatus of the invention, even in case of ambiguity where a destination cannot be specified, a concrete destination, such as a representative intersection or a representative landmark, is called from the ambiguous destination so that navigation to this destination can be performed.

In addition, entry of a destination can be made in a simple manner on a display screen and, moreover, by means of characters or the like.

In particular, in a case where the apparatus is applied to a navigation system of the type in which coordinates of a plurality of geographical points are set and guidance information for travel to a desired destination is outputted at each of the geographical points when the desired destination is inputted, the input operation is simplified and optimum course search can be carried out at all times. After a destination is designated, guidance information to the destination from any geographical point can be obtained.

BRIEF DESCRIPTION OF THE DRAWINGS

FIGS. 5(a) through 9 illustrate the structure of data according to the invention;

BEST MODE FOR CARRYING OUT THE INVENTION

Figure 1:
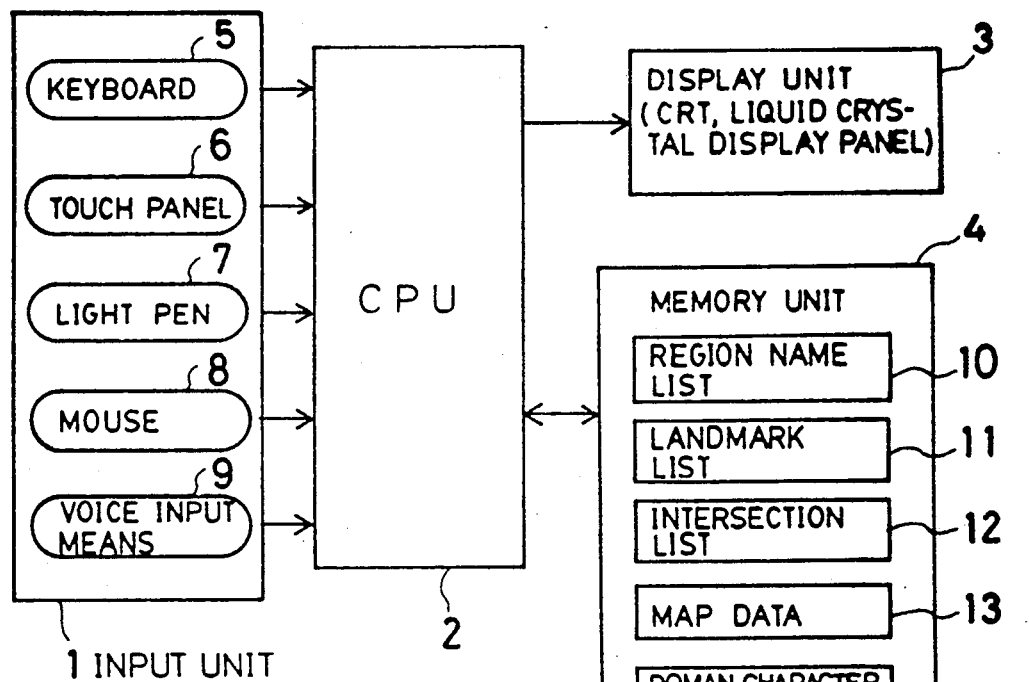
FIG. 1 is a view illustrating the construction of an embodiment of a navigation apparatus according to the present invention.

In FIG. 1, there are shown input means 1, a CPU 2, a display unit 3 such as a CRT or liquid crystal display panel, and a memory unit 4. A keyboard 5 comprises a ten-key pad and function keys for inputting code numbers of predetermined geographical locations, such as a desired destination and present position (guidance location). A touch panel 6, light pen 7, mouse 8 or voice input means 9 are employed instead of the keyboard 5. The memory unit 4 is a memory such as a ROM in which network data indicative of geographical points, namely desired destination and present position, and other information are stored in advance. As will be described below, a region name list 10, a landmark list 11, an intersection list 12, map data 13, a romaji (Roman character) sort file 14, a hiragana (the cursive Japanese syllabary) sort file 15, intersection data 16, landmark data 17 and road data are stored.

Figure 2:
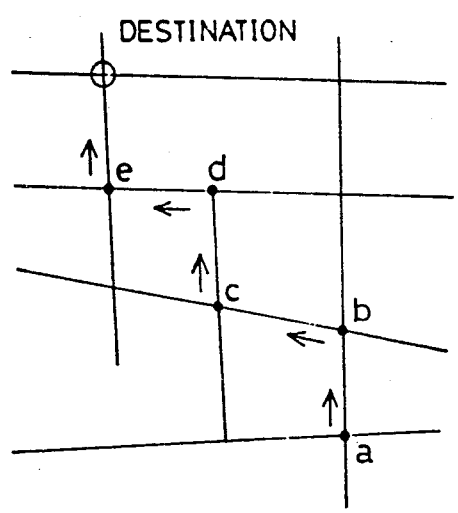
FIG. 2 is a view illustrating one example of a route sequence.

When a desired destination is designated by an input from the input means 1, the CPU 2 sets information for travel to the desired destination, as by course search, in accordance with each geographical point stored in the memory unit 4, and stores this information in a memory such as a RAM. When present position information is entered by the input means 1, the display unit 3 outputs guidance information for this point. If only intersections serve as geographical points, the guidance information for travel to the destination is an indication to, say, turn left or right at the next intersection, at this guidance is given at the intersection serving as the guidance point. In a case where there is a second intersection encountered immediately after turning at the aforementioned next intersection, it is of course possible for the outputted guidance information to include the direction of the first turn along with information designating the proper lane to take after the turn, as well as the direction of the second turn and the associated guidance information. For example, the display unit can output guidance information relating to a course leading to a desired destination in accordance with the path sequence a, b, c, ... shown in FIG. 2.

Figure 3:
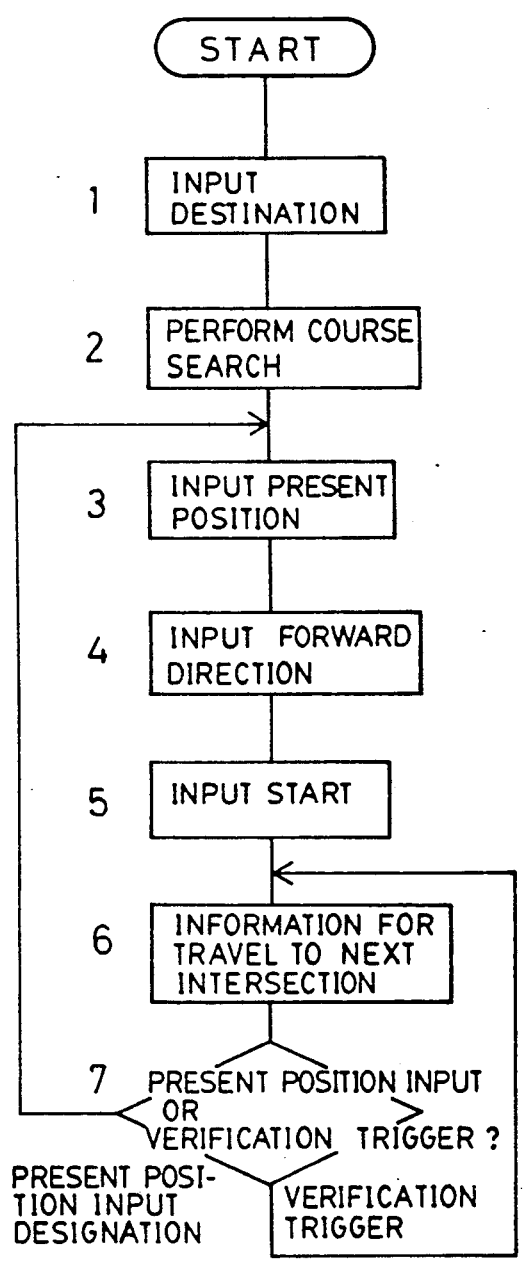
FIG. 3 is a flow chart describing the overall flow of navigation processing.

The flow of processing associated with the navigation apparatus of the invention will now be described with reference to FIG. 3.

When the driver enters the code of a desired destination [step ①], a course search mode is established in which information for travel to the desired destination is set for all geographical points with the exception of the entered desired destination [step ②]. When course search ends, a present position input mode is established, in which the driver inputs the code of his present position [step ③]. When this is done, the direction of forward travel from this position is outputted [step ④]. Next, when the driver inputs an intersection verification trigger [a start input, step ⑤], information for attaining the destination at the next intersection is outputted (step ⑥). Next, monitoring is performed [step ⑦] to see whether the intersection verification trigger or a signal from a present-position input button has been entered. If the intersection verification trigger has been entered, the program returns to the processing of step ⑥. If the signal from the present-position input button has been entered, the program returns to the processing of step ③. In other words, in accordance with this system, a trigger is inputted each time an intersection is verified providing that the vehicle is travelling as per instructions. If the vehicle strays from the instructed course and the driver notices this only after the vehicle has travelled to another intersection, the present-position input button is pressed. Accordingly, whenever a trigger is inputted, guidance information relating to an intersection on a route leading to the desired destination is outputted in sequential fashion. When the present position input button is pressed, the present position input mode is established.

Figure 4A:
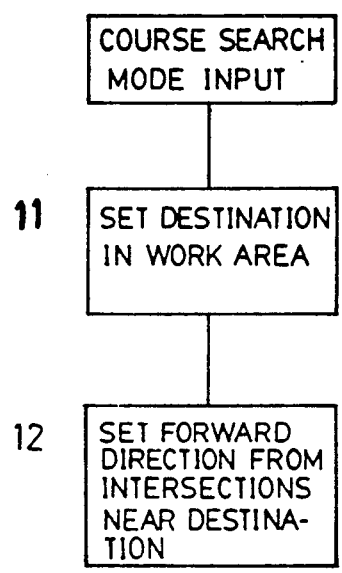
FIGS. 4a and 4b are flow charts describing course search processing.
Figure 4B:
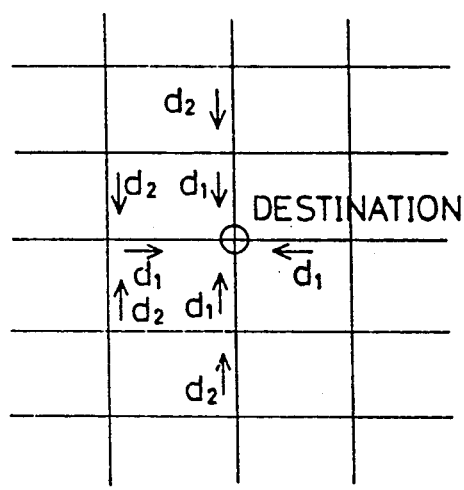

The course search processing of step ③ will now be described. When the course exploration input mode is established, as shown in FIG. 4(a), first the desired destination is set in a work area [step ⑪], after which forward directions from intersections near the destination are set [step ⑫]. As shown in FIG. 4(b), the set forward directions include forward directions $d_1$ at intersections before the destination, and forward directions $d_2$ at intersections before the first-mentioned intersections. It is permissible to execute this course search after the processing of step ③ in FIG. 3, in which case course search would be performed whenever present position is inputted. Furthermore, since guidance information is outputted in response to the trigger input in accordance with the route set as a result of course search, the pertinent intersections are limited in number. Accordingly, it will suffice to provide guidance information solely for the minimum number of intersections.

FIGS. 5 through 9 illustrate the structure of data in accordance with the invention. FIG. 5(a) is a list of the names of regions over a comparatively wide range, such as the names of urban and rural prefectures. For example, Prefecture No. 0 stands for "Aiti Prefecture". Included as data are the prefecture name in kanji (Chinese characters), hiragana and Roman characters, a city name list storage address (leading address), the number of items of city name list data, a representative intersection landmark number, etc. FIG. 5(b) illustrates a list of, e.g., district names of city names, which constitute information of lower significance than the names of regions. Included as data are the names of cities in kanji, hiragana and Roman characters, a town name list storage address (leading address), a representative intersection landmark number, etc. FIG. 5(c) illustrates a list of town names, which constitute information of still lower significance than the names of regions. Included as data are the names of towns in kanji, hiragana and Roman characters, the number of items of intersection list data, a landmark list storage address, a representative intersection landmark number, etc. By providing data having such a hierarchical structure, it is possible to retrieve destination inputs from prefecture name to town name and to set representative intersections or landmarks in prefecture units, city units or town units.

FIGS. 6(a), (b) illustrate intersection and landmark lists in which intersection numbers and landmark numbers are listed, respectively. FIGS. 6(c), (d) show Roman character and hiragana sort files, respectively. Place names are arranged in alphabetical order or in the order of the Japanese syllabary, and data storage addresses are provided corresponding thereto, thereby shortening the time needed to retrieve the place names.

FIG. 7(a) illustrates an example of intersection data. Stored as data in correspondence with the intersection numbers are intersection names, coordinates (north latitude and east longitude), the numbers of roads between intersections, and whether traffic signals are present. Thus, a variety of navigational information is displayed on a display screen. FIG. 7(b) shows an example of landmark data. Stored as data in correspondence with the landmark numbers are landmark names (e.g., the names of rivers, buildings, bridges and the like), coordinates and the numbers of connecting intersections.

Figures 8, 9:
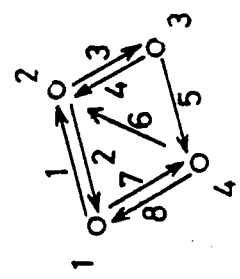

FIG. 8 shows an example of road data. As shown in FIG. 9, each road is assigned a road number(s). The stored road data include, for each road number, starting and end points (intersection numbers), the number of the next road having the same starting point, the number of the next road having the same end point, road width, road prohibition information, information relating to guidance not required (as when the driver need only continue travelling straight ahead), and photograph numbers.

Destination input, which is a characterizing feature of the invention, will now be described with reference to FIGS. 10 through 15.

Figure 10:
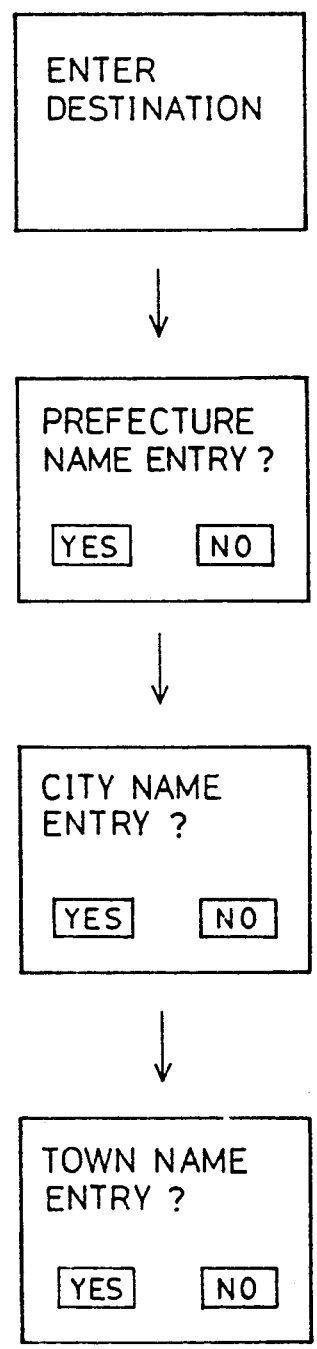
FIGS. 10 through 12(b) are views illustrating examples of screens used for destination input.
Figure 11A:
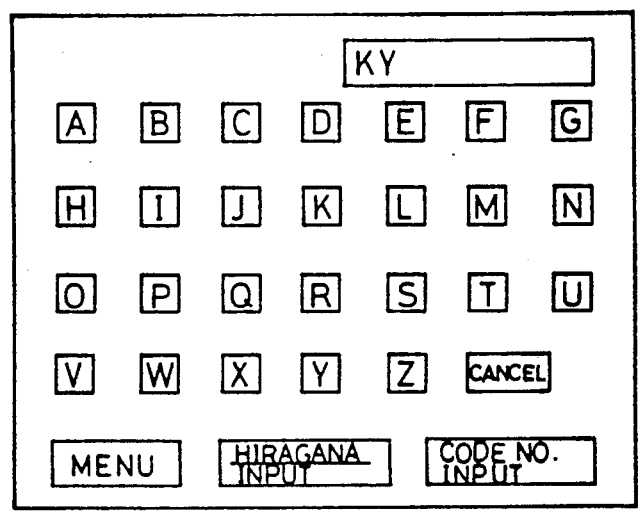
Figure 11B:
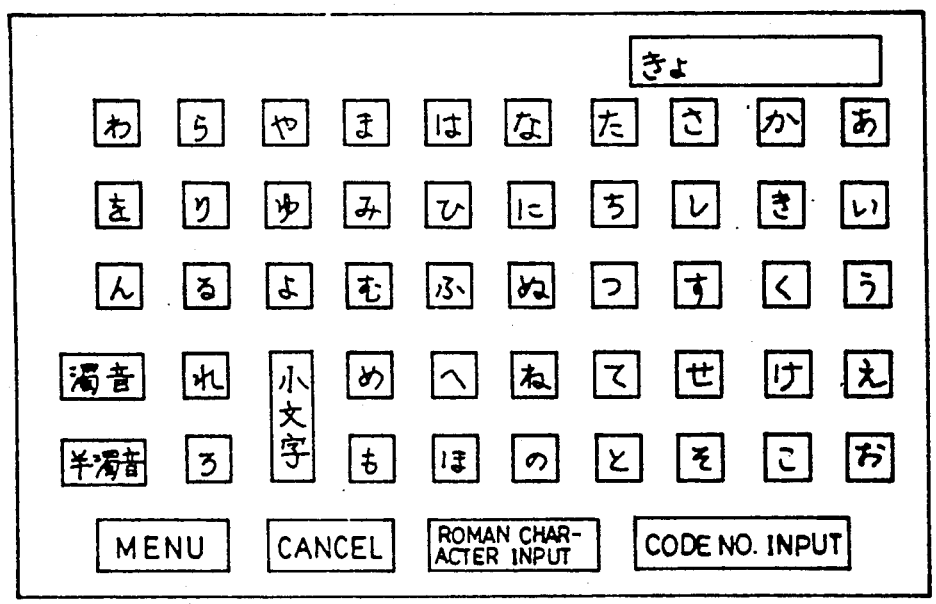

FIG. 10 illustrates examples of displays when inputting destination. FIG. 11 illustrates input screens when selecting prefecture name, city name or town name in accordance with FIG. 10. Input is made on the display by a touch panel, light pen, mouse or the like. FIG. 11(a) shows a Roman character input screen, (b) a hiragana input screen, and FIG. 12(a) a code number input screen.

Figure 12A:
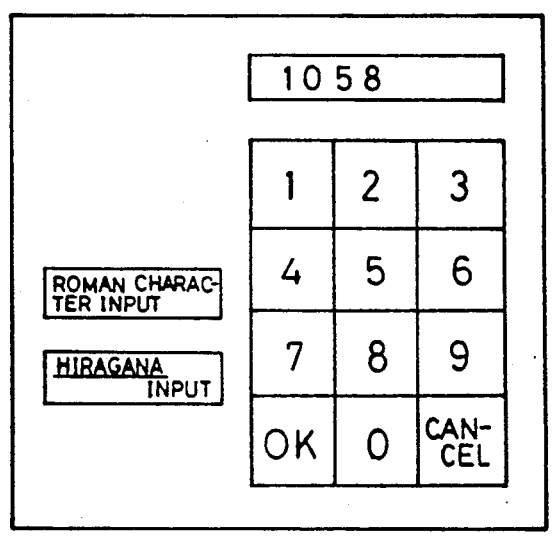
Figure 12B:
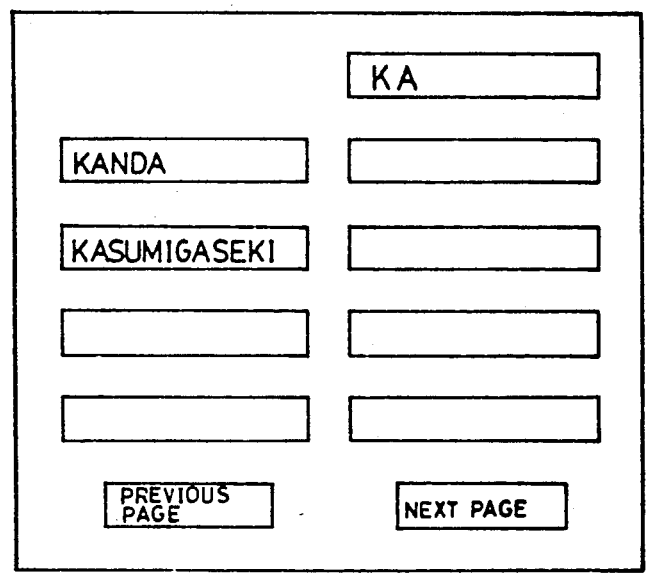

FIG. 12(b) depicts an example of a menu screen when a destination input is made. This illustrates a case in which "KA" is entered for retrieval and display of "KANDA, KASUMIGASEKI".

Figure 13:
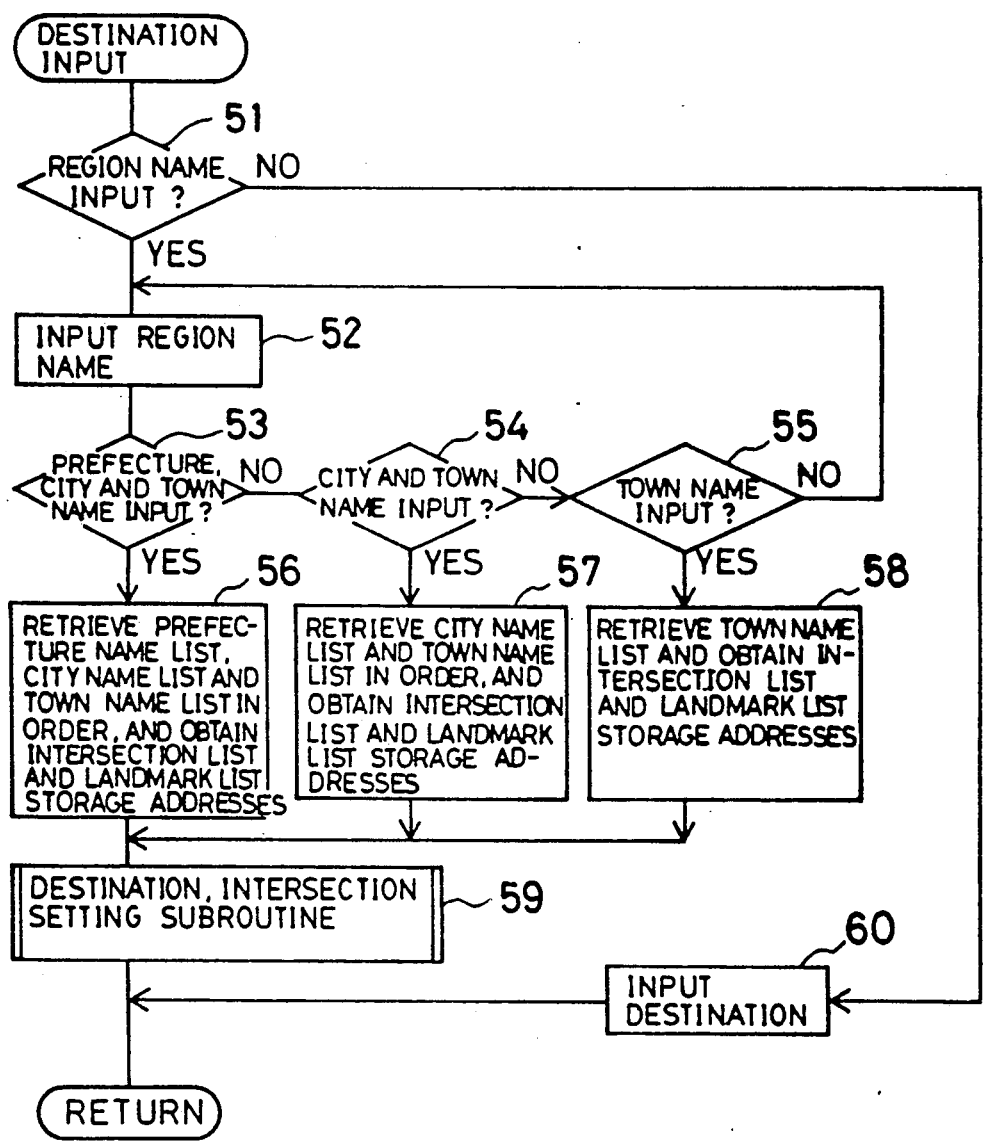
FIGS. 13 through 15 are flow charts describing the flow of destination input processing.
Figure 14:
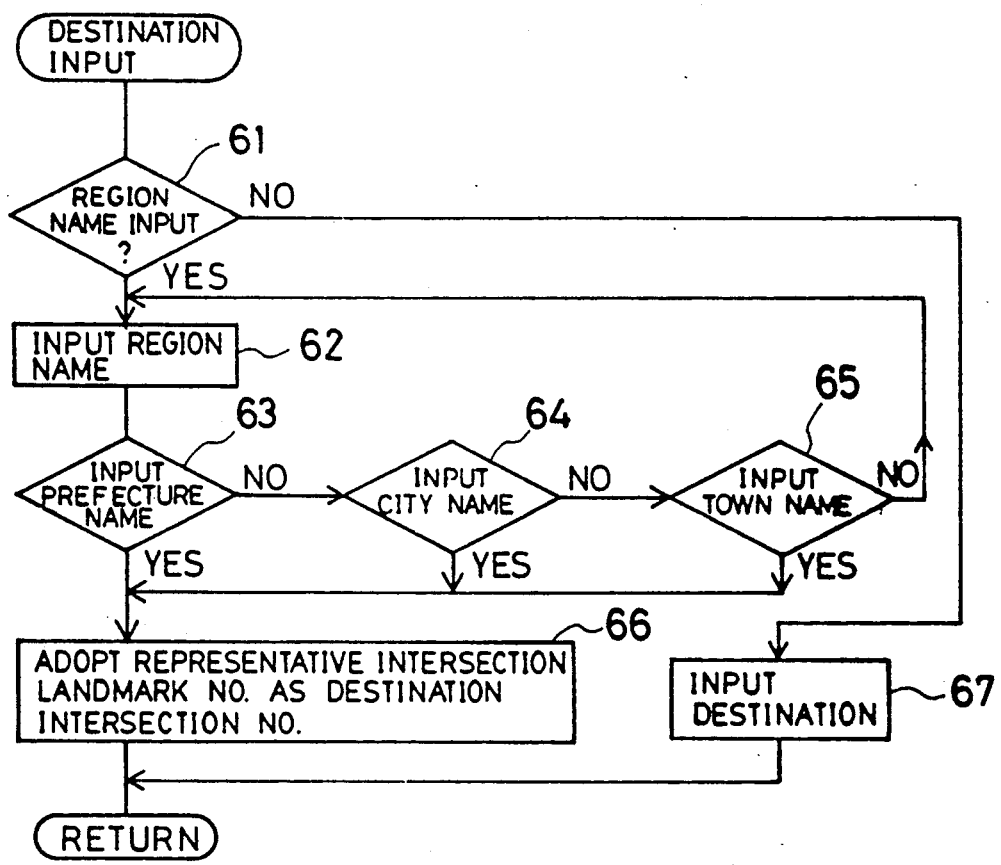

The flow of processing for destination input will now be described with reference to FIG. 13. First, at step 51, it is determined whether the name of a region has been entered. Depending upon the combination of prefecture name, city name and town name, the prefecture name list, city name list and town name list are retrieved in order and the storage addresses of the intersection list and landmark list are acquired (steps 52-58). Also, a routine 59 for setting the intersection of a destination is executed. FIG. 14 shows another embodiment. This embodiment differs from the foregoing in that the names of prefectures, cities and towns are entered individually (steps 62-65), and in that the number of a representative intersection or the number of a landmark is adopted as the destination intersection number at step 66.

Figure 15:
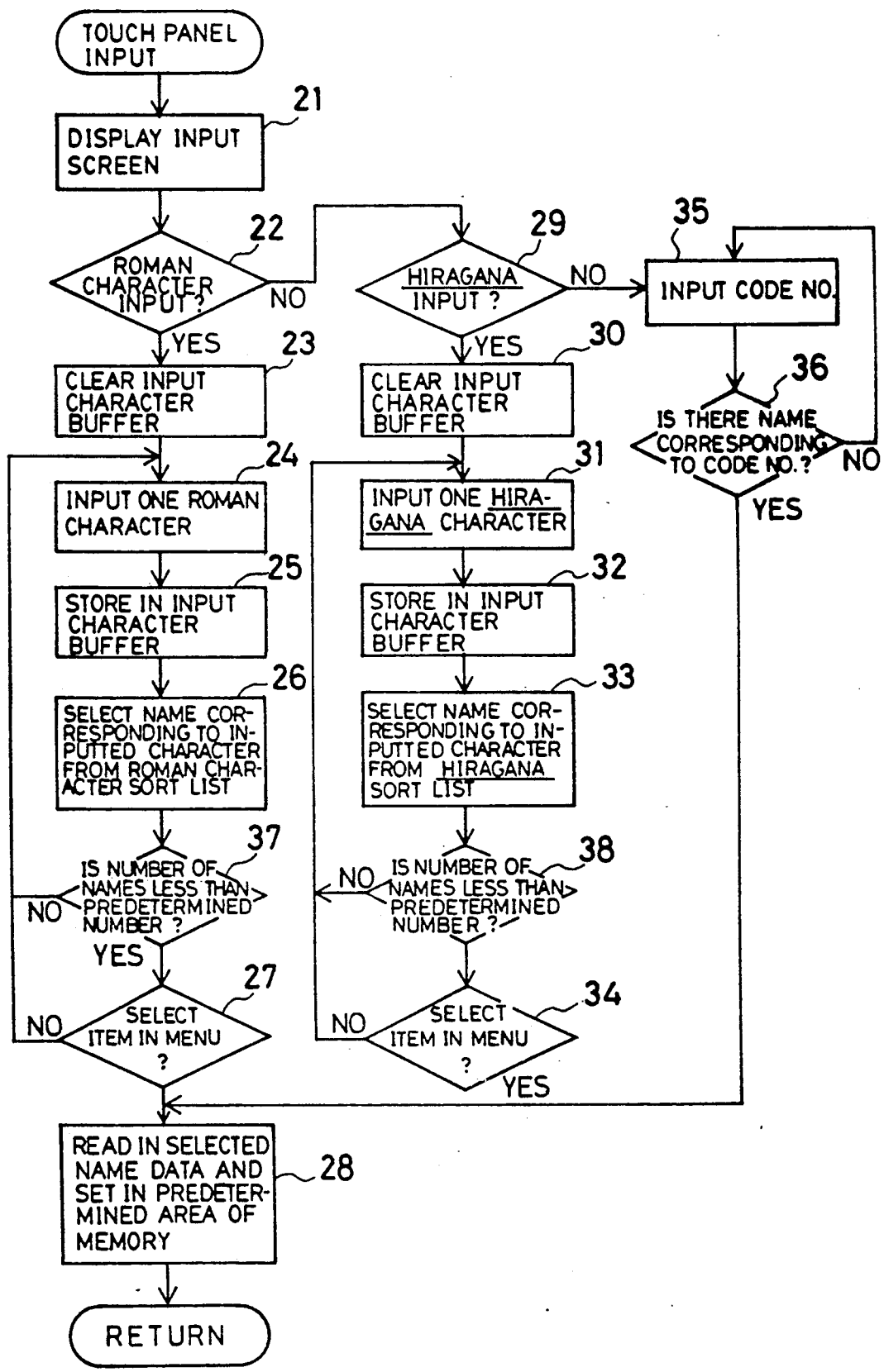

As shown in FIG. 15, the entry of prefecture name, city name and town name can be made in simple fashion by Roman character input or hiragana input through place name selection processing using a touch panel. First, the input screen is displayed at step 21, after which it is determined at step 22 whether a Roman character input is made. In case of a Roman character input, an input character buffer is cleared, one Roman character is entered and this is stored in the input character buffer (steps 23-25). Next, names corresponding to the character array in the character buffer are selected from the Roman character sort list and displayed on the menu screen (step 26). Processing which makes the number of place names corresponding to the character sequence smaller than a predetermined number is executed at step 37, and then an item in the menu is selected (step 27). If a selection can be made, name data selected at step 28 is read in and set in a predetermined area of a memory. If an item selected is not on the menu screen, the program returns to step 24 and the foregoing processing is repeated. If the input is not a Roman character input at step 22, it is determined at step 29 whether the input is a hiragana input. If it is a hiragana input, processing (steps 30-34), which is similar to the foregoing processing, is executed. If the input is not a hiragana input at step 29, a code number is entered (step 35). Then, if a name corresponds to the code number at step 36, the program proceeds to step 28. The above-described display of FIG. 12(b) is thus obtained.

Course search following the setting of a destination will now be described with reference to FIGS. 16 through 19.

Figure 16:
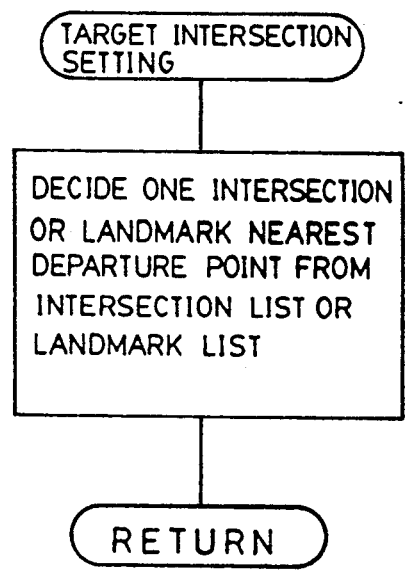
FIGS. 16 through 19 are flow charts describing the flow of course search processing.

First, as shown in FIG. 16, one intersection or landmark nearest the point of departure is decided from the intersection list or landmark list (this is course search).

Figure 17:
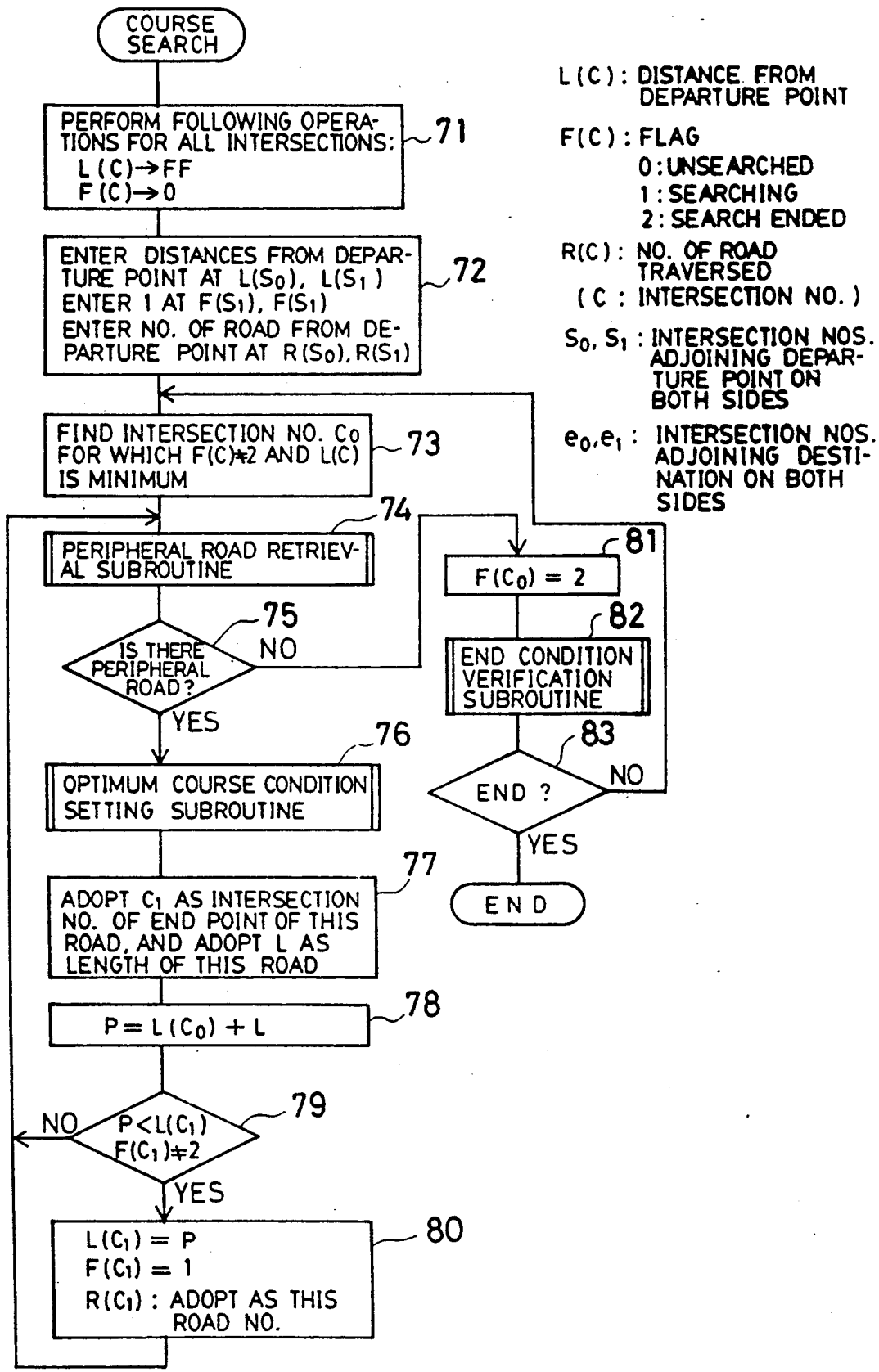

FIG. 17 is a flowchart illustrating course search processing. First, at step 71, distance from the point of departure is made FF with regard to all intersections, and a search flag is made 0 (unsearched). Step 72 calls for entry of distances from the point of departure to the two intersection numbers adjacent the point of departure on either side thereof, as well as entry of search flag 1 (searching) at these two adjacent intersection numbers. In addition, the number of the road taken from the point of departure is entered. The number of a road whose search flag is 2 (end of search) and which has the shortest distance is found at step 73. Peripheral road retrieval is performed at step 74. If a peripheral road is found to exist at step 75, a routine for setting optimum course conditions is executed (step 76), and the intersection number of the end point of this road and the distance thereof are entered at step 77. Distance is computed at step 78. If this distance is greater than the distance from the point of departure, this is taken as the distance from the point of departure, the search flag is set to 1 (searching) and this road number is entered (steps 79, 80). If the processing of steps 74–80 is executed and it is determined at step 75 that there is no peripheral road, then the search flag is made 2 and an end condition verification subroutine is executed (steps 81–83).

Figure 18:
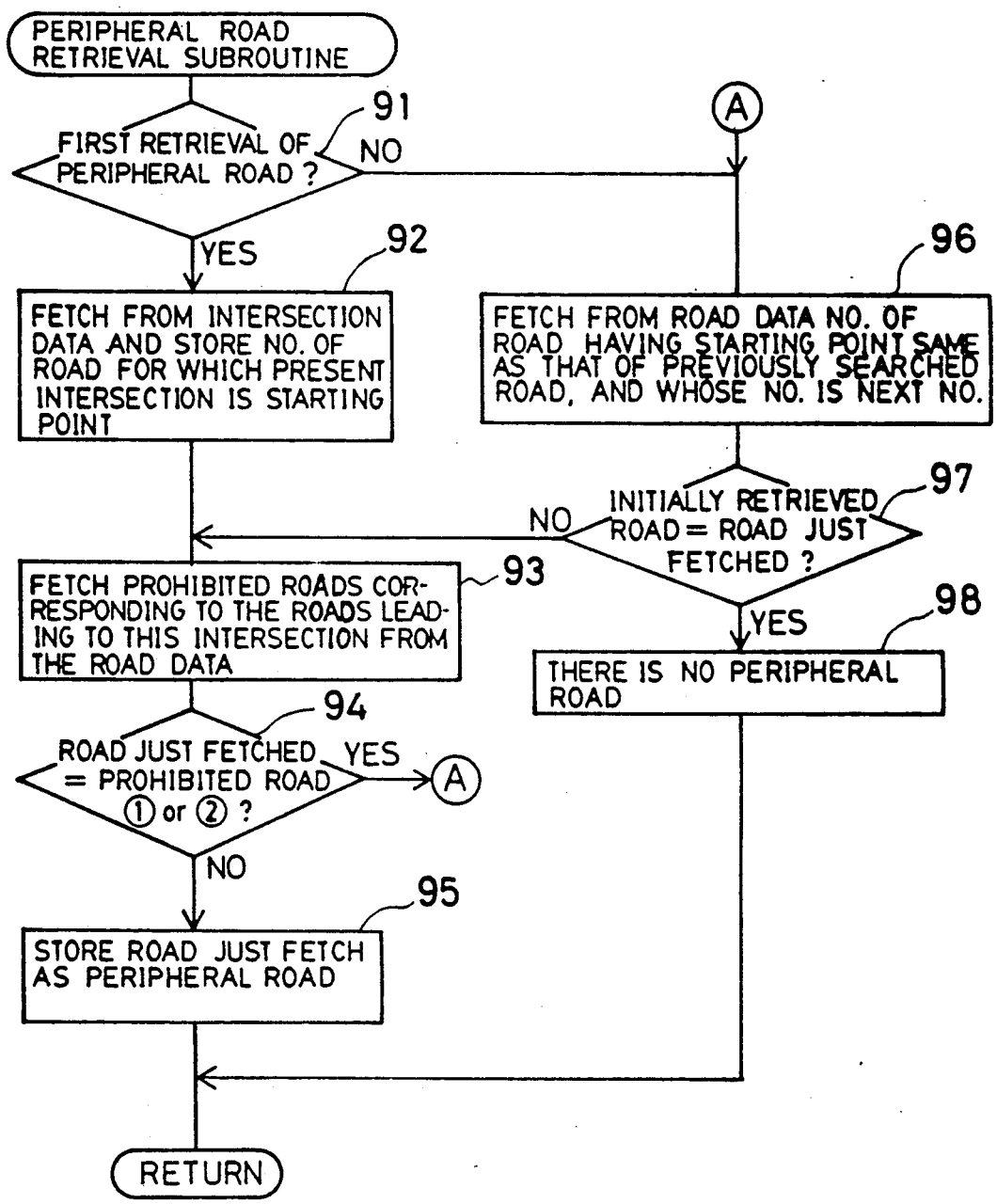

FIG. 18 illustrates the processing of the peripheral road retrieval subroutine shown at step 74 in FIG. 17. First, it is determined at step 91 whether peripheral road retrieval is being performed for the first time. If it is, the number of the road for which the present intersection is the starting point is fetched from the intersection data and stored at step 92. Next, at step 93, prohibited roads corresponding to the roads leading to this intersection are fetched from the road data, and it is determined at step 94 the road just fetched is a prohibited road, described in connection with FIG. 8. If the answer is YES, then the program proceeds to step 96; if NO, then the road just fetched is stored as a peripheral road. If peripheral road retrieval is not being performed for the first time at step 91, or if a YES answer is received at step 94, the number cf a road having a starting point the same as that of the previously searched road, and whose number is the next number, is fetched from the road data at step 96, and it is determined at step 97 whether the initially retrieved road and the road just fetched coincide. If they do not coincide, the program proceeds to step 93; if they do, it is construed at step 98 that there is no peripheral road.

Figure 19:
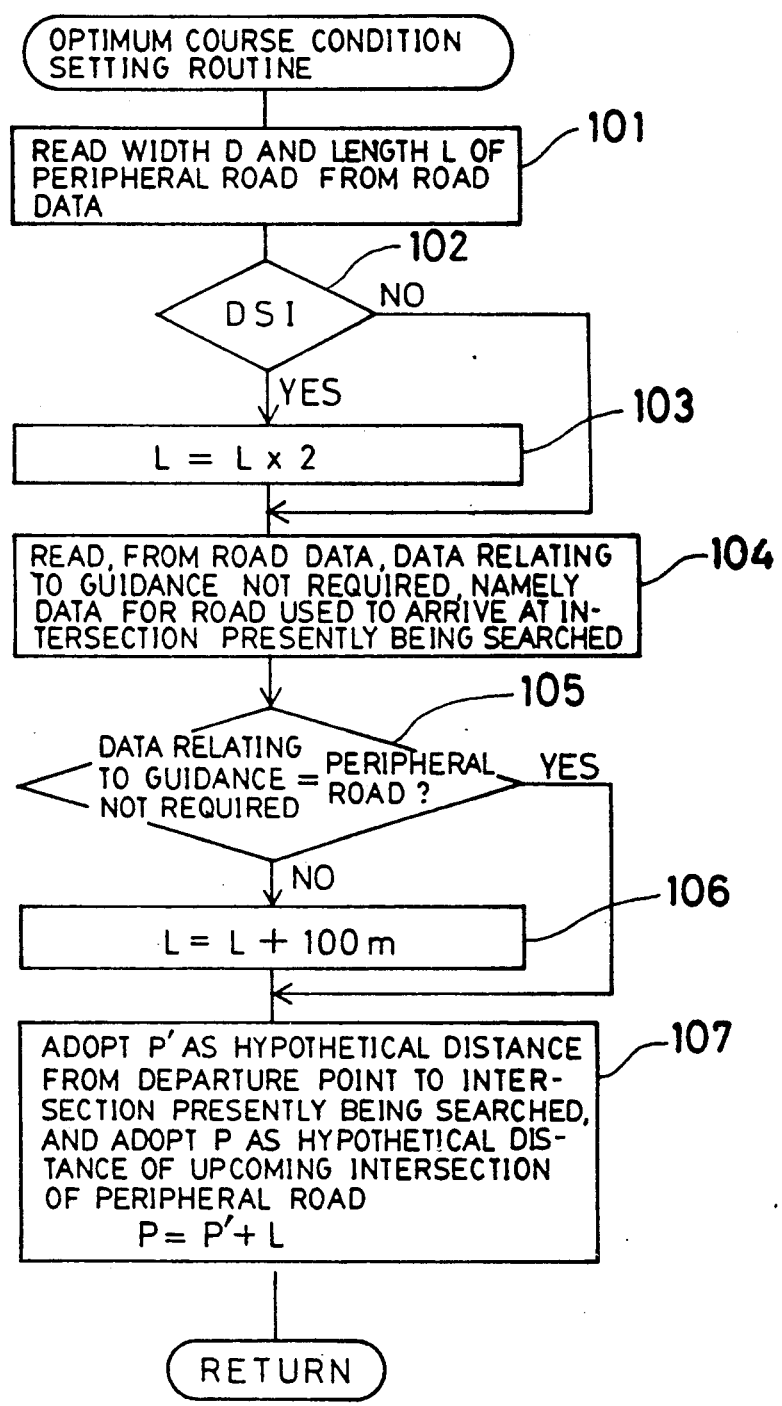

FIG. 19 illustrates the processing of the subroutine for setting the optimum course conditions at step 76 in FIG. 17. First, peripheral road width and length are read in from the road data and it is determined whether width is less than 1 m, by way of example (steps 101, 102). If the width exceeds 1 m, the program proceeds directly to step 104. If the width is less than 1 m, the length of the road is, say, doubled, data relating to guidance not required, namely data for the road used to arrive at the intersection presently being searched, is read in from the road data (steps 103, 104). Next, it is determined at step 105 whether the data relating to guidance not required is indicative of a peripheral road. If it is, the program proceeds to step 107; if not, 100 m, by way of example, is added to the length of the road. By adding, at step 107, the resulting distance to the hypothetical distance from the point of departure to the intersection presently being searched, this becomes the hypothetical distance to the upcoming intersection of the peripheral road.

The present invention is not limited to the foregoing embodiment but can be modified in various ways. For example, an arrangement can be adopted in which a place name list of specific regions is stored on an IC card or CDROM.

Further, it is permissible to adopt an arrangement in which the conventional set-up provided with a distance sensor or steering sensor is combined with the navigation apparatus of the present invention. The resulting system can be adapted in such a manner that, rather than the next geographical point being identified only when a switch is operated by the driver, the navigation apparatus identifies predetermined geographical points automatically by other means and changes over the guidance information delivered to the driver each time. With a combination of the present invention and the conventional system, it can be so arranged that a region having a simple road network, such as only a single road, is handled by the conventional system having the sensors, while a region having a complicated road network is dealt with by the system of the present invention. It can also be so arranged that the navigation apparatus of the present invention is used as a back-up if the conventional navigation apparatus fails. It is also possible to provide information relating to the distances between geographical points at which guidance is given, determine distance by a distance sensor and then urge the driver to input the next geographical point (i.e., to make a trigger input) by a voice track or visual display.

Further, in a case where it is arranged so that the driver can set a desired course, such as a route along back roads or a route along a principal road, each geographical point can be provided with information indicating whether the point is on a route of the desired category. By designating the category of road desired in the setting of the guidance information, course search can be carried out solely in terms of the geographical points along routes of the desired type.

Industrial Applicability

The navigation apparatus of the present invention is mounted on an automotive vehicle so that even a driver unfamiliar with the roads can travel to a desired destination with ease.

What is claimed is:

1. A navigation apparatus for providing course guidance for travel to a destination comprising:
   memory means for storing geographical data, said geographical data being in a hierarchical structure including region data pertaining to geographical regions and point data indicative of a plurality of geographical points located within said regions;
   region input means for selecting one of said regions;
   destination setting means for selecting one of said geographical points within the selected region as a set destination;
   present position input means for designating one of said geographical points as the present position;
   course search means for providing guidance information for travel to the set destination from said present position; and
   display means for displaying said guidance information.

2. A navigation apparatus according to claim 1, wherein said set destination is a representative intersection of a representative landmark within said selected region.

3. The navigation apparatus of claim 1 wherein said course search means provides said guidance information to the next intersection in sequence en route to said set destination, responsive to repeated input of said present position at intersections corresponding to at least some of said geographical points.

4. A navigation apparatus according to claim 1, wherein said region data includes high level data, middle level data, and low level data.

5. A navigation apparatus according to claim 4, wherein said high level data indicates regions which encompass at least one city, said middle level data identifies various cities within said regions and said low level data indicating towns within said various cities.

6. A navigation apparatus of claim 1, wherein said course guidance information includes information as to the optimum course to said set destination form each of said geographical points other than said set destination.

* * * * *

UNITED STATES PATENT AND TRADEMARK OFFICE
CERTIFICATE OF CORRECTION

PATENT NO. : 5,191,532

DATED : March 2, 1993

INVENTOR(S) : MOROTO et al

It is certified that error appears in the above-identified patent and that said Letters Patent is hereby corrected as shown below:

Column 4, line 55, delete "③" and insert --②--;

Column 10, line 2, delete "form" and insert --from--.

Signed and Sealed this

Fourth Day of January, 1994

Attest:

BRUCE LEHMAN

Attesting Officer   Commissioner of Patents and Trademarks